United States Patent
Buchanan, Jr.

[11] Patent Number: 5,906,071
[45] Date of Patent: May 25, 1999

[54] REAR-CENTER-MOUNTED POWER DOOR ACTUATOR

[75] Inventor: Harry C. Buchanan, Jr., Spring Valley, Ohio

[73] Assignee: ITT Automotive Electrical Systems, Inc., Auburn Hills, Mich.

[21] Appl. No.: 08/908,126

[22] Filed: Aug. 11, 1997

Related U.S. Application Data

[63] Continuation of application No. 08/575,643, Dec. 20, 1995, abandoned, which is a continuation-in-part of application No. 08/501,557, Jul. 12, 1995, Pat. No. 5,582,279.

[51] Int. Cl.⁶ ........................................................ B60J 5/06
[52] U.S. Cl. .................................................. 49/360; 49/214
[58] Field of Search .............................. 49/209, 210, 213, 49/214, 215, 280, 360; 296/146.4, 155

[56] References Cited

U.S. PATENT DOCUMENTS

| | | | |
|---|---|---|---|
| 3,334,443 | 8/1967 | Eskra et al. | 49/349 |
| 3,462,883 | 8/1969 | Reeks et al. | 49/360 |
| 3,533,188 | 10/1970 | Jones et al. | 49/360 |
| 3,653,154 | 4/1972 | Hayday | 49/280 |
| 3,662,491 | 5/1972 | Boyriven | 49/28 |
| 3,785,089 | 1/1974 | Smith | 49/139 |
| 3,874,117 | 4/1975 | Boehm | 49/264 |
| 4,050,189 | 9/1977 | Peterson | 49/26 |
| 4,152,872 | 5/1979 | Tanizaki et al. | 49/214 |
| 4,157,846 | 6/1979 | Whitcroft | 296/155 |
| 4,234,833 | 11/1980 | Barrett | 318/282 |
| 4,248,016 | 2/1981 | Pecchioni | 49/200 |
| 4,313,281 | 2/1982 | Richmond | 49/280 |
| 4,330,960 | 5/1982 | Hasemann et al. | 49/404 |
| 4,462,185 | 7/1984 | Shibuki et al. | 49/218 |
| 4,464,863 | 8/1984 | Chikaraishi et al. | 49/213 |
| 4,471,251 | 9/1984 | Yamashita | 310/89 |
| 4,503,638 | 3/1985 | Schindehutte | 49/213 |
| 4,529,920 | 7/1985 | Yoshida et al. | 318/466 |
| 4,530,185 | 7/1985 | Moriya et al. | 49/280 |
| 4,563,625 | 1/1986 | Kornbrekke et al. | 318/603 |
| 4,612,729 | 9/1986 | Sato | 49/362 |
| 4,617,757 | 10/1986 | Kagiyama et al. | 49/280 |
| 4,640,050 | 2/1987 | Yamagishi et al. | 49/280 |
| 4,644,692 | 2/1987 | Schindehütte | 49/213 |
| 4,674,231 | 6/1987 | Radek et al. | 49/360 X |
| 4,702,514 | 10/1987 | Perry | 296/146.9 |
| 4,738,052 | 4/1988 | Yoshida | 49/31 |
| 4,753,039 | 6/1988 | Jeuffray et al. | 49/213 |
| 4,769,584 | 9/1988 | Irigoyen et al. | 318/648 |
| 4,794,731 | 1/1989 | Willmott et al. | 49/199 |
| 4,801,172 | 1/1989 | Townsend | 296/155 |

(List continued on next page.)

*Primary Examiner*—Andrew C. Pike
*Attorney, Agent, or Firm*—J. Gordon Lewis

[57] ABSTRACT

A power drive moves a movable closure along a fixed path between an open and a closed position with respect to a portal defining a passage through a barrier. The power drive system is adapted for a sliding door mounted on at least one side of a vehicle for sliding movement forwardly and rearwardly of the vehicle. The system includes a reversible motor operable when actuated to selectively drive the door in opening or closing movement. A bracket is connected to the door for movement with respect to a guide connected to the side wall of the vehicle. The bracket is guided within the guide along a fixed path between the opened and closed positions of the door. An elongated drive member is connected to the bracket at one end for driving the bracket along the fixed path. The elongated drive member is slidably disposed within the guide. A translator mechanism operably engages with the drive member for powering movement of the drive member and connected bracket with respect to the guide along the fixed path. The translator mechanism can include a rotatable hub, operably engageable with the drive member, a gear transmission for driving the hub, and a clutch mechanism for connecting the motor to the transmission. The translator mechanism preferably has sufficient power to pull the sliding door into a primary latch position with respect to the corresponding portions of a latch mechanism attached to the door and frame defining the door opening.

11 Claims, 8 Drawing Sheets

U.S. PATENT DOCUMENTS

| | | | |
|---|---|---|---|
| 4,852,422 | 8/1989 | Mori | 74/502.6 |
| 4,862,640 | 9/1989 | Boyko et al. | 49/213 |
| 4,881,018 | 11/1989 | Kato et al. | 318/9 |
| 4,887,390 | 12/1989 | Boyko et al. | 49/214 |
| 4,914,859 | 4/1990 | Gionet et al. | 49/25 |
| 4,916,861 | 4/1990 | Schap | 49/31 |
| 4,922,168 | 5/1990 | Waggamon et al. | 318/286 |
| 4,965,502 | 10/1990 | Ogasawara | 318/628 |
| 4,967,083 | 10/1990 | Kornbrekke et al. | 250/341.7 |
| 4,983,963 | 1/1991 | Hodgetts et al. | 340/870.31 |
| 4,984,385 | 1/1991 | DeLand | 49/280 |
| 5,004,280 | 4/1991 | Schap | 292/341.16 |
| 5,025,591 | 6/1991 | DeLand et al. | 49/360 |
| 5,039,925 | 8/1991 | Schap | 318/282 |
| 5,046,283 | 9/1991 | Compeau et al. | 49/138 |
| 5,062,241 | 11/1991 | DeLand | 49/460 |
| 5,063,710 | 11/1991 | Schap | 49/280 |
| 5,066,056 | 11/1991 | Schap | 292/341.16 |
| 5,069,000 | 12/1991 | Zuckerman | 49/28 |
| 5,076,016 | 12/1991 | Adams et al. | 49/360 |
| 5,077,938 | 1/1992 | Moreuie | 49/362 |
| 5,105,131 | 4/1992 | Schap | 318/282 |
| 5,138,795 | 8/1992 | Compeau et al. | 49/138 |
| 5,140,316 | 8/1992 | DeLand et al. | 340/825.69 |
| 5,142,152 | 8/1992 | Boiucaner | 250/341.7 |
| 5,142,823 | 9/1992 | Brandenburg et al. | 49/118 |
| 5,146,712 | 9/1992 | Hlavaty | 49/360 X |
| 5,155,937 | 10/1992 | Yamagishi et al. | 49/280 |
| 5,172,947 | 12/1992 | Schap | 292/341.16 |
| 5,189,839 | 3/1993 | DeLand et al. | 49/360 |
| 5,203,112 | 4/1993 | Yamagishi et al. | 49/280 |
| 5,233,789 | 8/1993 | Priest et al. | 49/360 |
| 5,247,763 | 9/1993 | Hein | 49/31 |
| 5,253,452 | 10/1993 | Goldbach | 49/212 |
| 5,263,762 | 11/1993 | Long et al. | 296/146.4 |
| 5,280,754 | 1/1994 | Flanagan et al. | 105/341 |
| 5,282,663 | 2/1994 | Horton | 296/155 |
| 5,285,596 | 2/1994 | Kinsey | 49/404 |
| 5,316,365 | 5/1994 | Kuhlman et al. | 296/155 |
| 5,319,880 | 6/1994 | Kuhlman | 49/360 |
| 5,319,881 | 6/1994 | Kuhlman | 49/360 |
| 5,322,339 | 6/1994 | Dubernard | 296/155 |
| 5,323,570 | 6/1994 | Kuhlman et al. | 49/360 |
| 5,325,628 | 7/1994 | Yingling | 49/360 |
| 5,347,755 | 9/1994 | Jaster et al. | 49/25 |
| 5,361,540 | 11/1994 | Rogers, Jr. et al. | 49/449 |
| 5,383,304 | 1/1995 | Codina Soley | 49/215 |
| 5,389,920 | 2/1995 | DeLand et al. | 340/825.69 |
| 5,421,395 | 6/1995 | Horn | 160/405 |
| 5,422,552 | 6/1995 | Parise | 318/466 |
| 5,542,214 | 8/1996 | Buening | 49/360 X |

REAR-CENTER-MOUNTED POWER DOOR ACTUATOR

RELATED APPLICATIONS

The present application is a continuation of application Ser. No. 08/575,643, filed Dec. 20, 1995, now abandoned, which is a continuation-in-part application of U.S. patent application Ser. No. 08/501,557 filed Jul. 12, 1995, now U.S. Pat. No. 5,582,279 issued Dec. 10, 1996.

FIELD OF THE INVENTION

The present invention relates to a power drive for moving a movable closure, such as a sliding door, hatch, roof panel, or window, along a fixed path between an open position and a closed position with respect to a portal defining a passage through a barrier, and more particularly to a sliding door system accommodating manual operation and powered operation of a sliding door of a vehicle in forward and rearward movement along a fixed path between an open position and a closed position with a striker latch mechanism.

BACKGROUND OF THE INVENTION

It is generally known to provide a sliding door for van-type vehicles, where the door is moved along a fixed path generally parallel to the side wall of the van for a major portion of its opening and closing movement. Typically, the sliding door of a van-type vehicle moves generally into the plane of the door opening during a portion of its respective final closing and initial opening movements, so as to be flush with the side wall when fully closed, and moves generally out of the plane of the door opening during its initial opening movement so as to be along side of, and parallel to, the side wall of the vehicle in a position generally to the rear of the door opening when fully opened.

In van-type vehicles having sliding door systems, typically upper and lower forward guide rails or tracks are attached to the top and bottom portions, respectively, of the portal defining an opening through the wall of the vehicle, and a rear guide rail is attached to the exterior of the side wall, at an elevation approximately midway between the elevation of the upper and lower forward guide rails. The respective forward end portions of the various guide rails are curved inwardly with respect to the vehicle body, and bracket and roller assemblies are fastened to the respective upper and lower forward ends of the sliding door, as well as to an intermediate position at the rear end of the sliding door. The bracket and roller assemblies are slidingly supported in the guide rails to guide the door through its opening and closing movements.

Movement of the sliding door through a major portion of the rearward track or guide rail extending generally parallel to the side wall of the vehicle requires high displacement with low force to achieve the transitional movement, since only frictional resistance and gravity resistances due to changes in grade must be overcome. The movement of the sliding door through a forward portion of the guide rail track, curved inboard with respect to the vehicle, requires a low displacement with high force. The forces associated with an elastomeric weather seal surrounding the door opening must be overcome and an unlatched striker or fork bolt on the door must be engaged by a corresponding fork bolt or striker at the rear portion of the van body door opening. During manual operation, sliding van doors are typically moved with great momentum through the entire closing movement in order to ensure full weather strip compression and latch operation at the end of such movement.

SUMMARY OF THE INVENTION

It is desirable in the present invention to provide a power drive system for moving a movable closure along a fixed path between an open position and a closed position with respect to a portal defining a passage through a barrier, such that latch bolt operation and weather strip compression can be accomplished at the end of such movement without requiring high momentum during the closing movement. It is also desirable in the present invention to provide a power drive for moving a closure with low momentum between its fully open position and fully closed position, such that the closure is moved into the primary latch position in a controlled manner without requiring additional mechanisms for engaging and moving the striker from the secondary latch position through the final portion of closing movement into the primary latch position. It is also desirable to provide a smaller power drive package for installation in a vehicle. Providing a power drive system that does not leave the drive member under load is desirable so that the drive member is not subjected to stretching forces over long periods of time and so that the need for slack take-up mechanisms is eliminated. It is further desirable to provide a power drive system with high closing force and low momentum to move the latch mechanism into the primary position with the power drive motor.

The present invention provides for automatically closing sliding doors such that the controller and motor drive translates the door along the entire fixed path during opening and closing movement to carry the fork bolt or striker on the door through the secondary latch position to the primary latch position to ensure full door security and sealing. The present invention physically pulls the door and connected striker or fork bolt into the corresponding fork bolt or striker connected to a frame defining the opening, through the secondary position and into the primary latch position, then initiates power striker motion to move the door into the weather strip seals surrounding the opening. The center rear hinge roller track is modified to accept a push/pull drive member and the translation means is coupled to the track for pushing and pulling the door open and closed. The advantage of the present invention is to pull the roller assembly and door fork bolt assembly into the power striker all the way to the primary latch position, passed the secondary position. Previously known power drive systems required high momentum to ensure proper closing of the sliding door assemblies for van-type vehicles. The power striker of the present invention then actuates a power striker to pull the door into the seals. If the translator motor has sufficient power, the latch mechanism could be fixed. The present invention provides mechanical advantage to pull the door into the primary latch position through the secondary latch position with a drive member, such as DYMETROL tape, and then uses a power striker to ensure sealing. The drive member pushes the door open during initial opening movement, which is an action that takes far less force than required to pull the door into the weather strip seals when the fork bolt and striker are in the primary latch position.

The power drive according to the present invention moves a movable closure along a fixed nonlinear path between an open position and a closed position with respect to a portal defining a passage through a barrier. Bracket means is operably connected to the movable closure. Guide means is connected to the barrier and operably engages the bracket means for guiding the bracket means along the fixed path between the open and closed positions of the movable closure. Elongated means is slidably disposed within the guide means and connected to the bracket means for driving the bracket means along the fixed path. Translator means operably engages with the elongated means for powering movement of the elongated means and the bracket means connected thereto with respect to the guide means along the fixed path.

Other objects, advantages, and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
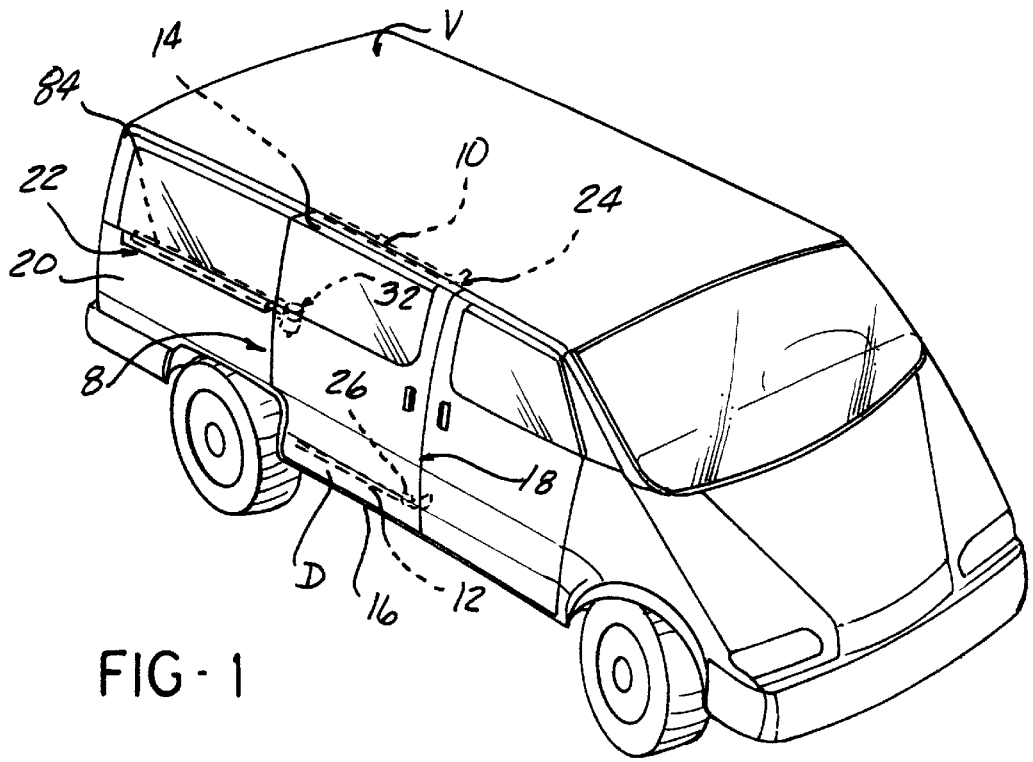
FIG. 1 is a perspective view of a movable closure disposed in a closed position with respect to a portal defining a passage through a barrier, such as a sliding door mounted on a van-type vehicle.
Figure 3:
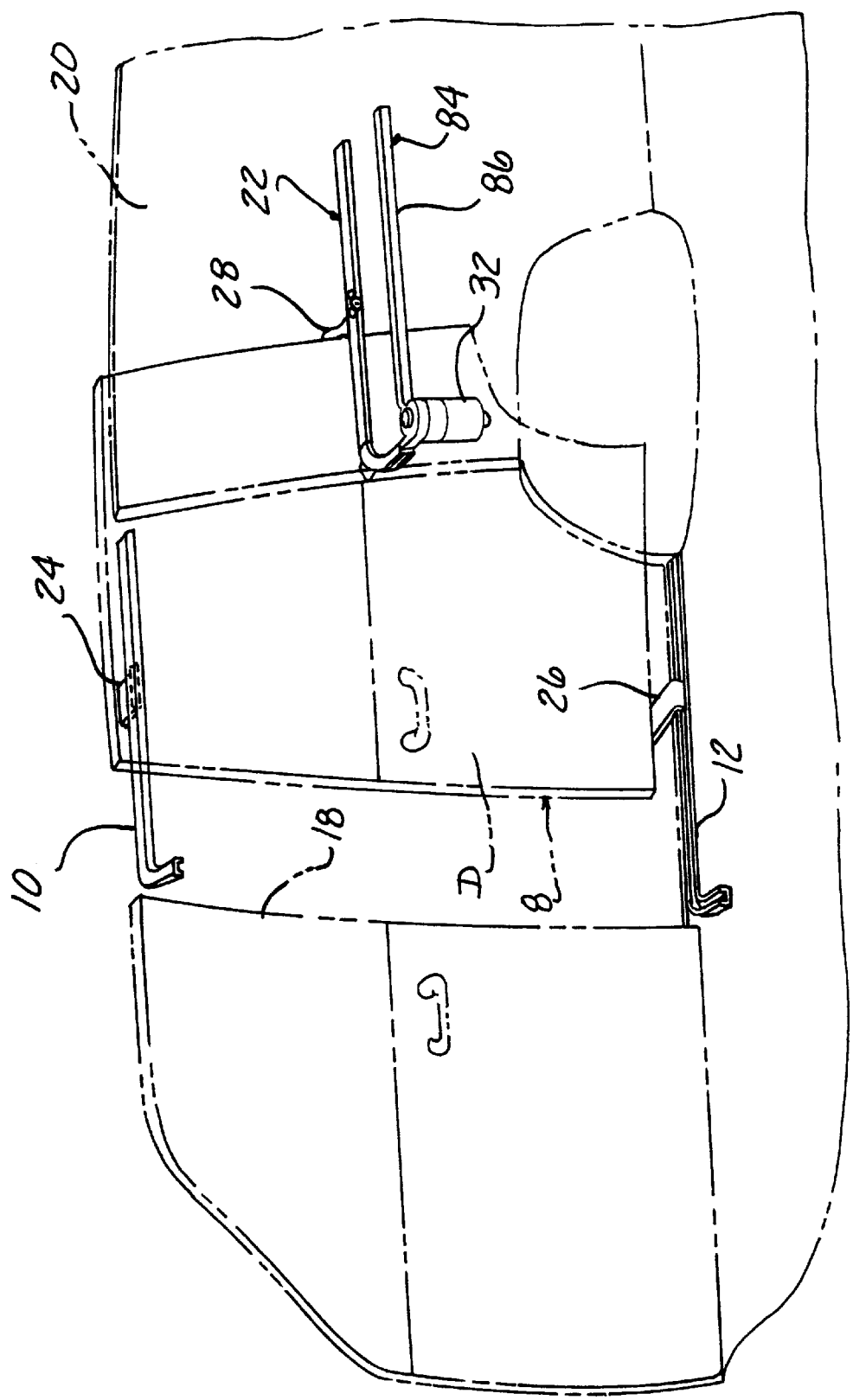
FIG. 3 is a perspective view illustrating a power drive according to the present invention mounted with respect to the van-type vehicle.

In FIGS. 1 and 3, there is shown a barrier, for example a wall of a vehicle such as a van V, having a movable closure 8, such as a sliding door D located on at least one side of the vehicle. Vans using such sliding doors have been available for years and the structural arrangements by which the door is mounted on the vehicle for manual movement between the closed position shown in FIG. 1, where the door is sealingly seated in a door opening, and an open position in which the door is disposed at the side of the van rearwardly of the door opening, is well known. In the standard arrangement, the door is latched in its closed position, typically by mechanical latches at the front and rear edges of the door, the latches being mechanically linked to a latch actuator mounted within the door to be simultaneously released by manual actuation of appropriate door handles or electronically released in response to a signal from an electronic control switch or unit. In many cases, the rear latch may include a power-driven striker mechanism which is latchingly engaged with the door as it approaches its closed position and is power driven to move the latched door to its fully closed position in compression against the seal member extending peripherally around the door opening of the vehicle.

Figure 2:
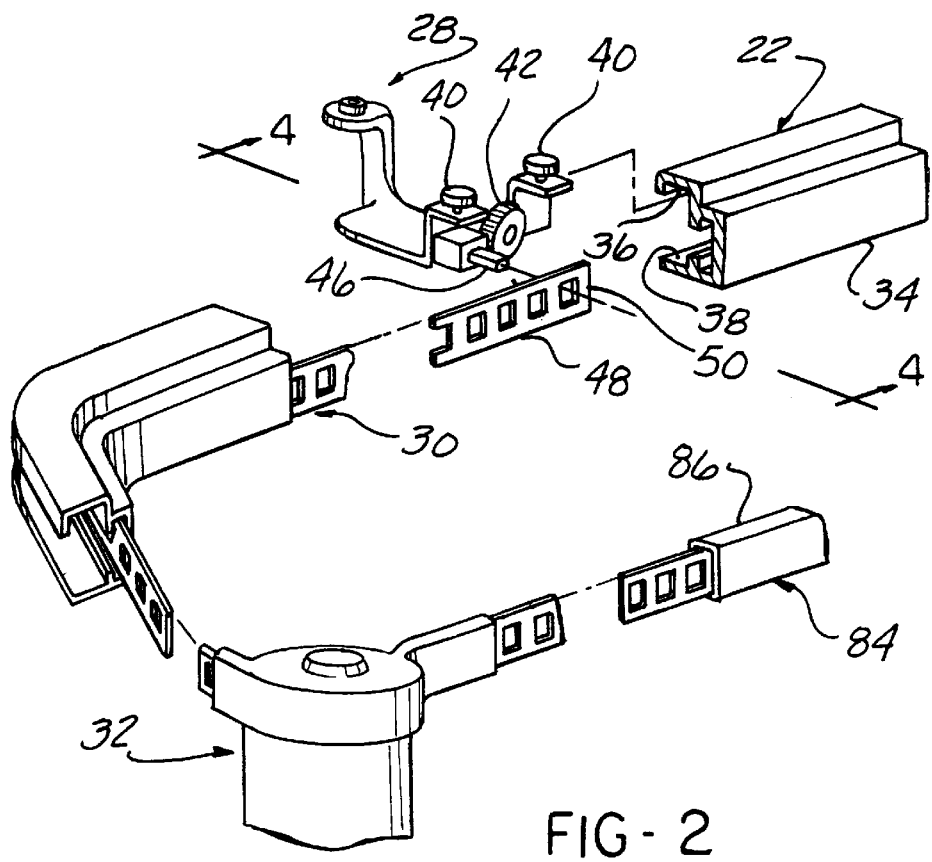
FIG. 2 is an exploded perspective view of a power drive according to the present invention for moving the movable closure.

The present invention is directed to certain components of a power drive system by means of which a movable closure, such as a sliding door, hatch, roof panel, window, or the like, can be power driven in either direction between its open and closed positions. Referring generally to FIGS. 1–3, a van-type vehicle V with at least one sliding door D typically includes upper and lower forward guide rails, tracks, or slots,. 10 and 12 respectively, attached to the top and bottom portions, 14 and 16 respectively, of the portal 18 defining an opening through the barrier 20, such as a wall of the vehicle. A rear guide means 22, such as a rail, track, or slot, is attached to, or formed in, the exterior of the side wall of the vehicle at an elevation approximately midway between the elevation of the upper and lower forward guide rails 10 and 12. The respective forward end portions of the various guide means, including the upper, lower, and rear guides, curve inwardly with respect to the vehicle body. A bracket and roller assembly 24 and 26 are fastened to the respective upper and lower forward ends of the sliding door D. Bracket means 28 is operably connected to the movable closure adjacent a rear edge generally midway between the first and second edges. The bracket and roller assemblies 24 and 26, and the bracket means 28, are slidingly supported in the corresponding guide rails 10 and 12 and guide means 22 to guide the movable closure through opening and closing movements with respect to the barrier. The guide means 22 is connected to the barrier generally midway between the first and second guide tracks, 10 and 12 respectively, and operably engages the bracket means 28 for guiding the bracket means 28 along the fixed nonlinear path between the opened and closed positions of the movable closure. Elongated means 30 is slidably disposed within the guide means 22 and connected to the bracket means 28 for driving the bracket means 28 along the fixed path. Translator means 32 is operably engageable with the elongated means 30 for powering movement of the elongated means 30 and connected bracket means 28 with respect to the guide means 22 along the fixed path, the translator means being disposed adjacent an edge of the frame for the opening generally midway between the first guide track 10 and the second guide track 12.

Figure 4:
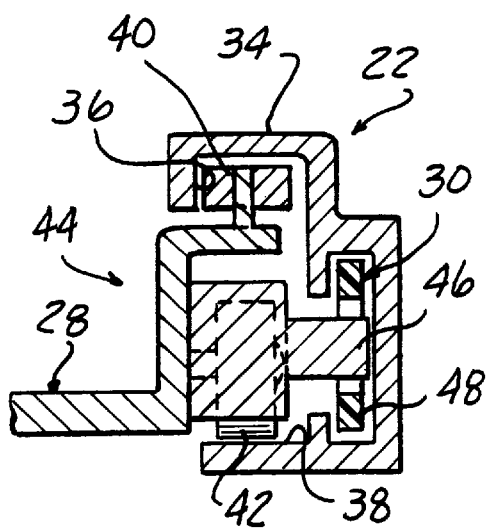
FIG. 4 is a detail cross-sectional view of guide means for guiding bracket means connected to the movable closure taken along line 4—4 as shown in FIG. 2.
Figure 5:
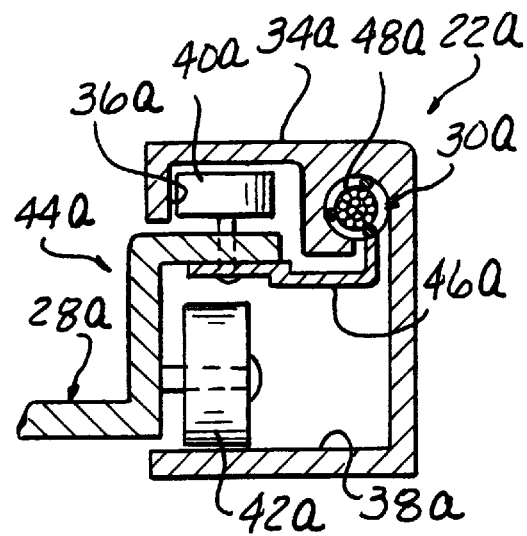
FIG. 5 is a cross-sectional view similar to that of FIG. 4 of an alternative configuration of the guide means for guiding the bracket means connected to the removable closure taken along a line similar to line 4—4 as shown in FIG. 2.
Figure 6:
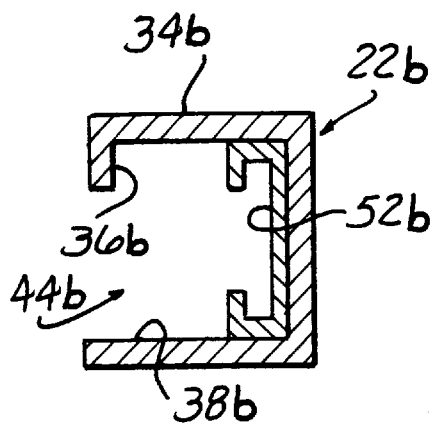
FIG. 6 is a cross-sectional detailed view of an alternative construction of the guide track illustrated in FIG. 4.
Figure 7:
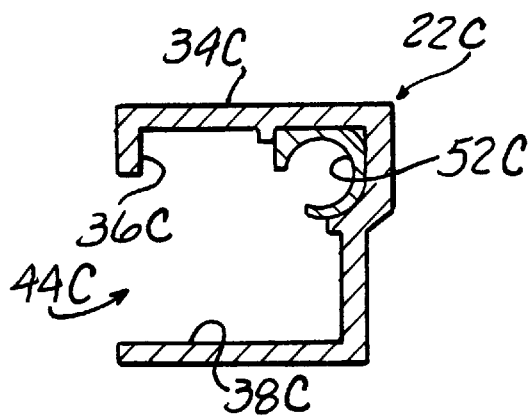
FIG. 7 is a cross-sectional detailed view of an alternative construction for the guide track illustrated in FIG. 5.
Figure 10:
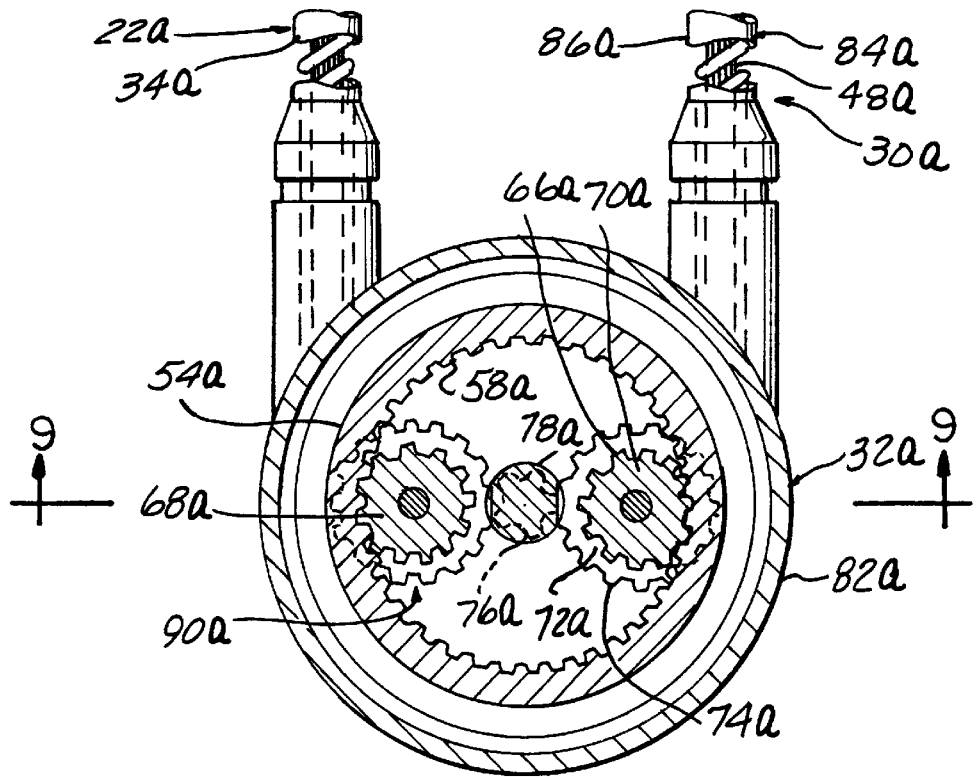
FIG. 10 is a cross-sectional plan view of the translator means taken along a line 10—10 illustrated in FIG. 9.

For FIGS. 1–11, alternative embodiments are designated with the same base numeral followed by an alphabetic designation "a", "b", or "c" for purposes of clarity, but only the base reference numeral will be used hereinafter for simplicity since the following description is generally generic to all embodiments, except as noted. As best seen in FIGS. 2 and 4–7, the rear guide means 22 includes an elongated track or housing 34. The elongated track or housing 34 typically defines at least two surfaces 36 and 38 disposed at an angle with respect to one another engageable with rollers 40 and 42 respectively. The rollers 40 and 42 typically have axes of rotation that are disposed at an angle with respect to one another, generally corresponding to a 90° angle as illustrated in FIGS. 4 and 5. In the illustrated embodiments of FIGS. 4–7, the guide means 22 defines a slot 44 of sufficient dimension to permit the bracket means 28 to extend therethrough. The housing 34 generally defines a first chamber for receiving the rollers 40 and 42, and a second chamber for slidably receiving the elongated means 30. The first and second chambers are in communication with one another longitudinally along the length of the housing 34 allowing attachment of the bracket means 28 to the elongated means 30 or 30*a*, such as by coupling member 46 or 46*a*. The elongated means 30 may include a tape-like drive member 48 as illustrated in FIGS. 2 and 4. The tape-like drive member 48 is commercially available under the trade name DYMETROL. The elongated means 30 or 30*a* is slidably guided within the second chamber of the housing 34 to move the bracket means 28 with respect to the guide means 22. The elongated means 30 or 30*a* can include an elongated drive member having first and second ends, where the first end 50 is connected to the bracket means 28 by coupling member 46 or 46*a*. The elongated means 30 or 30*a* operably engages with the translator means 32 to pull the bracket means 28 along the guide means 22 from the open position to the closed position. The translator means 32 can be reversed to push the elongated means 30 or 30*a* and connected bracket means 28 with respect to the guide means 22 in order to move the movable closure from the closed position to the open position. This provides a push/pull drive member and thereby reduces or eliminates the problems associated with previously known pull/pull cable systems used to power sliding doors on van-type vehicles. The elongated means 30*a* can also be in the form of a push/pull helically wound cable-like drive member 48*a* as illustrated in FIGS. 5, 9, and 10. As previously described, the cable-like drive member 48*a* is slidably received within the second chamber defined by the housing 34*a*, and connected to the bracket means 28*a* by coupling member 46*a*. The helically wound cable-like drive member 48*a* operably engages the translator means 32*a* (FIGS. 9 and 10) in order to pull the movable closure from the open position into the closed position. The helically wound, cable-like drive member 48*a* can be pushed by the translator means 32*a* (FIGS. 9 and 10) within the second chamber of the housing 34*a* in order to drive the bracket means 28*a* along the guide means 22*a* from the closed position to the open position. The cable-like drive member 48a is commercially available under trade names, such as TELEFLEX, HILEX, or SUHNER cable. The housing 34 may be formed as a single piece, such as by extrusion, injection molding, or metal forming, or in the alternative may be constructed of a plurality of individual pieces assembled into a track 34 having a first chamber for receiving the rollers 40 and 42 and a second chamber for receiving the drive member 48 or 48*a*. In the preferred configuration, the first chamber of the housing 34 is disposed adjacent to the slot 44 and the second chamber for slidably receiving the drive member 48 or 48*a* is disposed spaced from the slot 44. As best seen in FIGS. 6 and 7, the portion of the housing 34*b*, 34*c* forming the second chamber for slidably receiving the drive member may be formed of a separate track or channel 52*b*, 52*c* connected with respect to the housing 34*b*, 34*c*. Referring now to FIGS. 4–7, various embodiments of: guide means 22, 22*a*, 22*b*, 22*c*; bracket means 28, 28*a*; elongated means 30, 30*a*; elongated track or housing 34, 34*a*, 34*b*, 34*c*; at least two surfaces 36, 38, 36*a*, 38*a*, 36*b*, 38*b*, 36*c*, 38*c*; rollers 40, 42, 40*a*, 42*a*; slot 44, 44*a*, 44*b*, 44*c*; coupling member 46, 46*a*; drive member 48, 48*a*; and separate track or channel 52*b*, 52*c* are illustrated.

Figure 8:
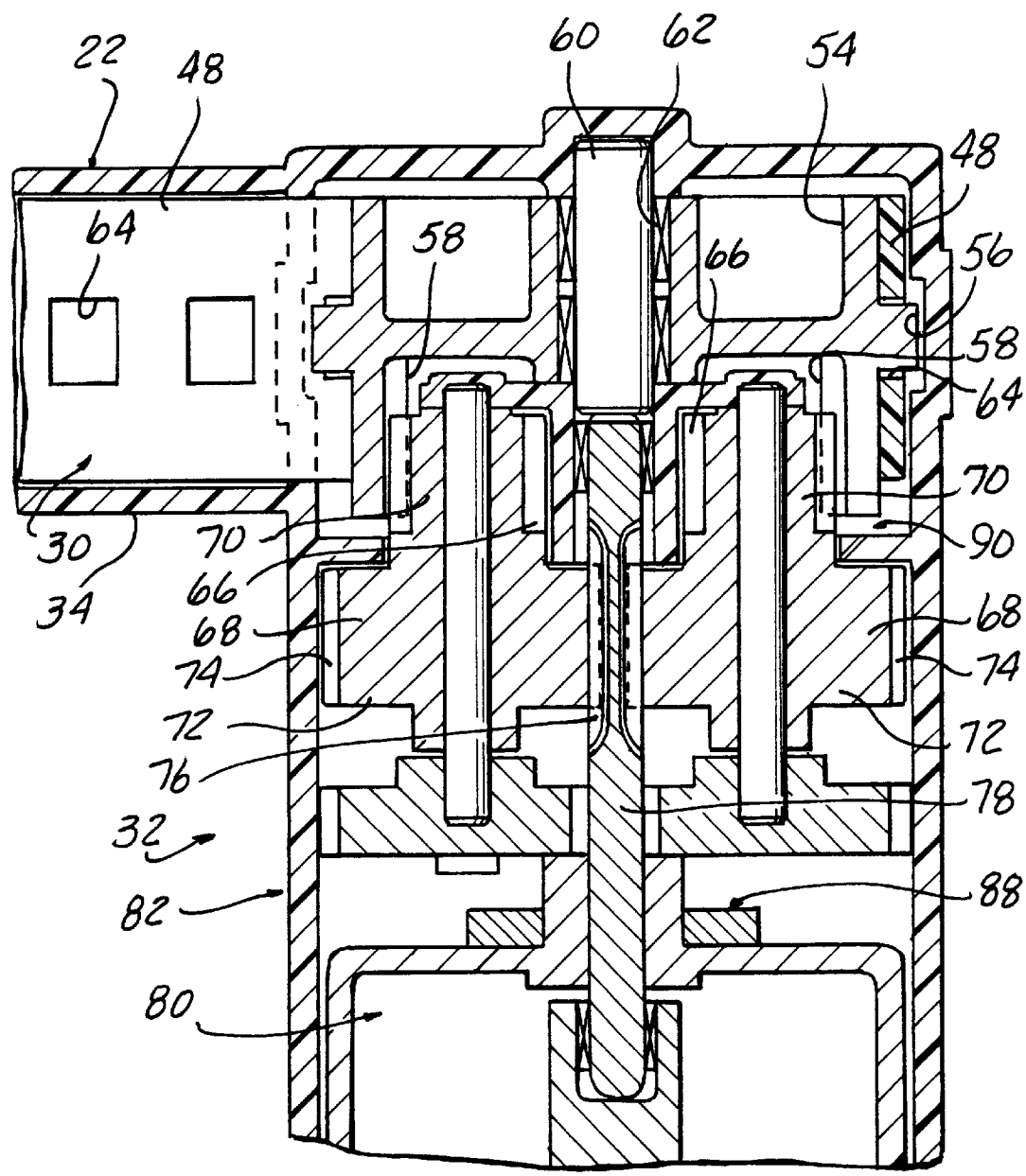
FIG. 8 is a partial cross-sectional view of translator means according to the present invention for powering movement of the movable closure with push/pull tape-type drive member taken along a line similar to line 9—9 as shown in FIG. 10.
Figure 9:
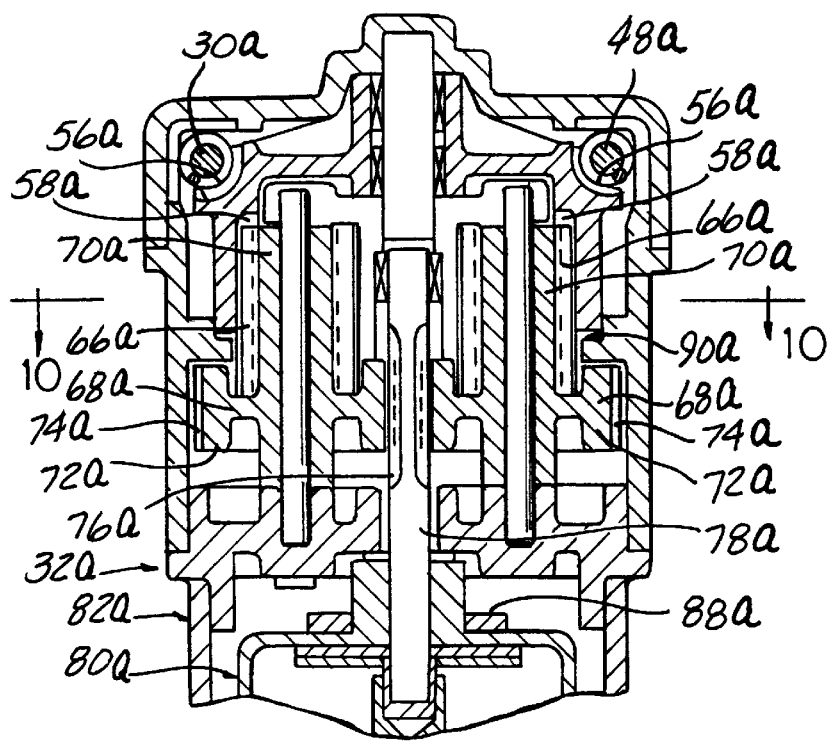
FIG. 9 is a partial cross-sectional view of an alternative configuration of translator means according to the present invention for powering movement of the closure means with a helically wound push/pull cable-type drive member taken along a line 9—9 as shown in FIG. 10.

Referring now to FIG. 8, the translator means 32 includes a rotatable hub 54 having drive member engaging protrusions 56 on an external surface and a plurality of gear teeth 58 formed on an internal periphery. The hub 54 is rotatably connected to a first shaft 60 by bearings 62. In FIG. 8, the drive member 48 is illustrated in a tape-like form having a plurality of apertures 64 formed therein spaced longitudinally from one another, and adapted to receive the drive member engaging protrusions 56 formed on the hub 54. The plurality of first gear teeth 58 intermeshingly engage with a plurality of second gear teeth 66 formed on at least one intermediate gear 68. Each intermediate gear 68 is rotatable about an axis of rotation. As illustrated in FIG. 8, the axis of rotation of each intermediate gear 68 is offset from the axis of rotation of the hub 54. Each intermediate gear 68 includes a reduced diameter portion 70 supporting the plurality of second gear teeth 66 on an external periphery thereof, and an enlarged diameter portion 72 having a plurality of third gear teeth 74 supported on an external periphery thereof. The third gear teeth 74 intermeshingly engage with a plurality of fourth gear teeth 76 connected to or formed on a second shaft or pinion 78. The plurality of first, second, third, and fourth gear teeth 58, 66, 74, and 76 respectively, including hub 54, intermediate gear 68, and pinion 78, define gear means 90 for transmitting rotary motion from the clutch means 80 into linear movement of the drive member 48 along the guide means 22 in either direction to impart opening and closing movement to the closure member. The pinion 78 is connected to clutch means 80 for driving the pinion 78 in rotation about a rotatable axis. As illustrated in FIG. 8, the rotatable axis of the pinion 78 is coaxial with the rotatable axis of the hub 54. The clutch means 80 is driven in rotation by a motor, not shown in FIG. 8. Housing means 82 encloses the hub 54, intermediate gear 68 and clutch means 80.

While useful in other applications, the power drive system of the present invention is especially well adapted for use in operating the sliding door of a vantype vehicle. All power drive systems for sliding doors require a power system capable of driving an output member coupled to the door in either direction over a relatively long working stroke. In van-type vehicle applications of the power drive system, the sliding door is conventionally mounted at the passenger side of the van, but may also or alternatively be mounted on the driver's side, and a major convenience of the system is that it may be power operated by control switches accessible from the driver's seat. However, if the driver is outside the van loading or unloading articles through the sliding door, the power controls are out of reach and there are many occasions where in this situation the driver will want to open or close the door manually. Additionally, there may be situations where it is desirable to override the speed of the door closing to manually close the sliding door faster than provided by the power drive system. If the door is positively mechanically linked to the power source of the drive, this connection will interfere with manual operation of the door. Therefore, it is desirable in the present invention to provide a clutch with override capability. Further, it is desirable in the present. invention to normally maintain the clutch in a disengaged position. In addition, it is desirable in the present invention to cause the clutch to engage in response to acceleration of the power drive for the system.

The clutch according to the present invention uses centrifugal forces to disengage at high rotational speeds. Also, Coriolis acceleration component forces may be used in the clutch of the present invention to assist in camming the clutch out of engagement, or into engagement. The present invention allows a motorized power drive system to be manually disengaged and manually overridden without harming the driving mechanism.

According to the clutch of the present invention, a shaft driver or spindle engages a drum or cup driven through first and second clutch plates or shoes. The rapid acceleration of the motor spindle causes the first and second clutch plates to radially extend or expand to engage the drum. The present invention locates the respective center of gravities of the first and second clutch plates so that centrifugal force does not encourage coupling of the clutch. In fact, if the clutch is ever overridden, the contact force between the clutch plate and cup force tends to zero causing the clutch to disengage. Additional mass or counterweights are provided in each clutch plate to ensure that the center of gravity of the clutch plate is less than the clutch plate throw or very close to zero when in a running condition. As force is applied by the spindle, the force overcomes the clutch plate inertia propelling the clutch plate radially outward as it rotates to contact the drum. The shaft of the motor only rotates, while the clutch plates simultaneously rotate and move radially outward. As the rotational speed increases, so does the centrifugal force, causing the contact force to decrease. Eventually the contact force goes to zero and the clutch is in effect disengaged. At this point, without other controls, the motor will accelerate to its free speed. The clutch should be designed such that this speed is high enough to "reset" the device to its initial configuration. The clutch according to the present invention disengages when an overrun is attempted, where an overrun is generally defined as a rotational speed approximately greater than the free motor speed or limiting/critical clutch disengagement speed.

In the clutch of the present invention, a driver is attached to an output shaft of a motor. Clutch plates or shoes are initially resting against the driver by virtue of preloading by a spring (or springs). The present invention requires that the driver and shoes move relative to one another during startup, clutch engagement and overrun. Since the shoes are counterweighted such that the tendency of each shoe is to clamp against the driver as the angular speed is increased, the relative motion between the driver and the shoes must be initiated immediately at startup. The present invention requires the spring load that exists at startup and when the driver and shoes move together to be determined; and once this is known, the spring preload can be selected such that the desired relative motion between the driver and the shoes will occur. The clutch according to the present invention is evaluated as having two degrees of freedom.

Referring now to FIGS. 12–15, the clutch 80 according to the present invention includes a driven shaft or spindle 212 having a driver block 214 connected thereto. The spindle 212 is disposed within a rotatable cup or drum 216. The drum 216 may have a smooth interior surface 218, or can be formed with radially inwardly extending lugs, serations, or teeth 220.

Means 222 is disposed radially between the spindle 212 and the drum 216 for moving radially with respect to the axis of rotation of the spindle between an engaged position and a disengaged position with respect to the drum 216. The moving means 222 is responsive to acceleration of the spindle 212 for moving into the engaged position, and is responsive to high rotational speed for moving into the disengaged position. Biasing means 224 normally maintains the moving means 222 in the disengaged position when the spindle 212 is at rest. The moving means 222 preferably includes a radially expandable rim surface 226, sometimes referred to herein as an engagement surface or clutch surface, for engaging the interior surface 218 of the drum 216. The rim surface 226 may define a friction clutch surface for engaging the surface 218 of drum 216. The moving means 222 can alternatively include a positive engagement rim surface 226 having at least one radially extending lug, or a plurality of preferably spaced radially extending teeth 228 for engagement with the radially inwardly extending lugs or teeth 220 on the interior surface 218 of the drum 216.

The moving means 222 preferably includes at least one counterweighted shoe 230, and more preferably first and second counterweighted shoes 230 and 232, respectively, for collapsing radially inwardly against the driver block 214 of the spindle 212 in response to increased angular or rotational speed beyond a predetermined value. The predetermined value of angular or rotational speed generally corresponds to a rotational speed greater than a free motor speed of the spindle 212. In addition, the moving means 222 is weighted for moving radially outwardly into the engaged position in response to rapid angular acceleration, while also being counterweighted for moving radially inwardly into the disengaged position in response to high rotational speeds. By way of example and not limitation, the spindle according to the present invention is capable of a fast start or rapid angular acceleration, in the range of approximately 18,000 radians per second squared (radians\sec$^2$) . Also by way of example and not limitation, the free-wheeling speed of the spindle 212 according to the present invention is in the range of approximately 3,600 to 4,000 revolutions per minute.

The moving means 222 preferably includes an engagement surface or rim 226 for contact with the drum 216 and a center of gravity, such that the axis of rotation of the spindle 212 is interposed diametrically between the engagement surface 226 and the center of gravity. In operation, the moving means 222 defines a clutch surface, such as a rim surface 226, that disengages from the drum 216 in response to centrifugal force acting on the center of gravity during overload or overrun conditions. In other words, the moving means 222 is operable such that the clutch surface 226 is responsive to centrifugal force and Coriolis force, created by radial acceleration of the center of gravity diametrically opposed to the clutch surface 226, to release the clutch surface 226 from engagement with the interior surface 218 of the drum 216.

Referring now to FIGS. 12 through 15, the moving means 222 preferably includes first and second counterweighted shoes, 230 and 232 respectively. Each shoe includes an engagement surface, sometimes referred to herein as a clutch surface or rim surface 226. A spring groove is formed in the face of the rim surface 226 for receiving and allowing passage of the biasing means 224. Axially extending wall means define a driver block receiving pocket for operably engaging the driver block 214 connected to the spindle 2i2 for transferring torque and rotary motion from the spindle 212 through the first and second shoes, 230 and 232 respectively, to the rotatable drum 216. The pocket is oversized, and preferably complementary in shape to the driver block 214 sufficiently to allow limited relative rotation between the driver block 214 and the pockets defined in each of the first and second shoes, 230 and 232 respectively. The pockets may further be defined by a radially extending wall having an arcuate cutout allowing passage of the spindle 212 therethrough. The wall means interacts with driver block 214 to cammingly urge the first and second shoes 230 and 232 radially outwardly in diametrically opposite directions in response to rapid acceleration of the spindle 212 during startup, thereby engaging the rim surface 226 with the interior surface 218 of the rotatable drum 216 for transmitting torque and rotary motion from the spindle 212 to the drum 216. Each counterweighted shoe 230 and 232 includes a counterweight disposed diametrically opposite from the rim surface 226. The counterweights are of sufficient size and density to shift the center of gravity to a position diametrically opposite from the rim surface 226, so that centrifugal force created by high rotational speed acting on the counterweight causes the rim surface 226 to move radially inwardly, and to disengage from the interior surface 218 of the drum 216. The center of gravity is disposed on the opposite side of the rotational axis of the spindle 212 from rim surface 226, so that the rotational axis of the spindle 212 is interposed between the center of gravity and the rim surface 226 for each of the first and second shoes, 230 and 232 respectively.

Guide means is formed on each of the first and second shoes, 230 and 232 respectively, in order to guide the relative movement of the first and second shoes with respect to one another along a radially extending diameter extending from the axis of rotation of the spindle 212 and generally bisecting the peripheral arc of the rim surface 226 on each of the first and second shoes, 230 and 232 respectively. Each of the first and second shoes, 230 and 232 respectively, is formed with a counterweight receiving pocket for receiving the counterweight of the other shoe. The pocket allows relative radial movement between the first and second shoes as best seen by comparing the disengaged position illustrated in the cross-sectional view of FIG. 13 with the engaged position illustrated in the cross-sectional view of FIG. 15. Each counterweight is connected to the remaining portion of the shoe by at least one, and preferably two arms extending from the counterweight to the counterweight receiving pocket of the shoe. The counterweight receiving pocket has an alignment rib extending radially inwardly therein. A rib receiving groove or aperture is formed in the counterweight of the other shoe. When the first and second counterweighted shoes, 230 and 232 respectively, are disposed in overlaying, overlapping relationship to one another, the counterweight of the first shoe 230 is received within the counterweight-receiving pocket of the second shoe 232 with the alignment rib of the second shoe 232 slidably received within the aperture of the first shoe 230, while the counterweight of the second shoe 232 is received within the counterweight receiving pocket with the alignment rib of the first shoe 230 slidably received within the aperture of the second shoe 232. In addition, the arms of the first and second shoes slidingly engage along the external surface of the wall means. The guide means is defined by the interaction of arms with external surfaces and alignment rib with aperture of each of the first and second shoes, 230 and 232 respectively.

The clutch selectively transmits torque and rotary motion from a spindle having an axis of rotation to a drum. First and second shoe members disposed radially between the spindle and the drum move radially with respect to the axis of rotation between an engaged position and a disengaged position with respect to the drum. The first and second shoe members are responsive to acceleration for moving into the engaged position and responsive to rotational speed for moving into the disengaged position. A biasing spring normally maintains the first and second shoe members in the disengaged position when the spindle is at rest.

A more detailed description of the clutch means 80, by way of example and not limitation, is disclosed and illustrated in U.S. Pat. No. 5,582,279 issued Dec. 10, 1996 for "Acceleration Reaction Clutch With Override Capability", which is incorporated by reference herein.

According to the present invention, the barrier is a construction forming an extended indefinite surface preventing or inhibiting the passage of persons or things, and can include a wall, ceiling, roof, or cover for a stationary structure or a movable vehicle, such as the van V. The portal is structure defining an opening through the barrier for passage of persons or things, such as the framing of a door, window, hatch, or roof panel opening. The movable closure is an obstructive structure whose presence in or before a passage bars traffic through the passage and is mounted to move in a regular, repetitive, predetermined path with respect to the portal so as to alternately open or close the passage, and can take the form of a hatch, a sliding window, a roof panel, or a sliding door D. Clutch means 80 provides for overrunning with respect to the intermediate gear 68 in response to manual manipulation of the movable closure, or for slipping in response to the movable closure contacting an obstruction prior to reaching the opened or closed positions.

The housing means 82 is connected to the guide track 34 for feeding the drive member 48 or 48a into operable engagement with the hub 54 or 54a, and dispenses the drive member 48 or 48a into storage means 84, shown in FIGS. 2 and 3, for storing the portion of the drive member 48 or 48a driven through the hub 54 or 54a. The storage means 84 may include a storage track 86 as best seen in FIGS. 2 and 3. It should be recognized that the location of the translator means 32 can be moved from that shown in FIGS. 1–3. The location of the translator means 32 can be moved by providing an appropriate length of drive member guide means 22 between the closed position and the translator means 32, and by adding an appropriate amount of spent drive member storage means 84 to accommodate the longer length of the drive member 48.

The door drive system according to the present invention uses a push/pull drive member 48 or 48a connected at one end to the movable closure, such as the door D, and guided in longitudinal movement within a guide track 34 which extends parallel to the path of movement of the door at a position generally midway between the upper and lower edges of the portal or door opening. The drive member 48 or 48a is driven in longitudinal movement by a reversible electric motor controlled by an electronic control unit in a manner such that the door may be automatically stopped in response to sensing of an overload, such as the jamming of an object between the closing door and the door frame, or providing for express operation and cancellation. The employment of an electronic control unit enables the power drive for the door to be operated in a safe and efficient manner, as by providing the door with an antipinch capability by automatically stopping the drive if an object becomes trapped between the closing door and the door frame, providing for express operation and eliminating the need for limit switches to sense specific door positions.

Electronic control units capable of being programmed to perform these, and similar functions, are well known and commercially available from a variety of sources.

Position sensing means 88 or 88a can be provided on the clutch means 80 or 80a for signaling the location of the sliding door D during manual and powered movement. Sensing means 88 or 88a is responsive to rotary movement of the clutch means 80 or 80a for transmitting to the electronic control unit a signal representative of the location of the door along the fixed path. The sensing means 88 or 88a can include a magnet connected to the clutch means 80 or 80a for rotation therewith and a magnetic sensor connected to the housing means 82 for sensing the position of the magnet as it passes by the sensor during rotation for transmitting to the electronic control unit a signal representative of the location of the door allowing the fixed path of travel between the open and closed positions during manual and powered operations.

Referring now to FIGS. 9 and 10, an alternative configuration of the translator means 32a is illustrated for use with a drive member 48a having a helically wound cable-like form. The previous description with respect to the translator means 32 illustrated in FIG. 8 and clutch means 80 illustrated in FIGS. 12–15 is equally applicable to the description of FIGS. 9 and 10 and structure has been labeled with like reference numerals to refer to like parts throughout the several views of FIGS. 8–10 with the addition of alphabetic designation "a" after the numerals of FIGS. 9–10 to designate the alternative embodiment for purposes of clarity. Referring now to FIGS. 9 and 10, an alternative embodiment of: guide means 22a; elongated means 30a; translator means 32a; elongated track or housing 34a; drive member 48a; hub 54a; drive-member-engaging protrusions 56a; gear teeth 58a; second gear teeth 66a; intermediate gear 68a; reduced diameter portion 70a; enlarged diameter portion 72a; third gear teeth 74a; fourth gear teeth 76a; second shaft or pinion 78a; clutch means 80a; housing means 82a; drive member storage means 84a; storage track 86a; position sensing means 88a; and gear means 90a are illustrated. In the translator means 32a illustrated in FIGS. 9 and 10, the drive member engaging protrusions 56a take an arcuate form in order to operably engage with at least one wire-like member helically wound in uniformly spaced turns around the core of the push/pull cable. The wire-like member or members are preferably disposed over an entire longitudinal length of the core to form a flexible screw-like member having an exterior helical gear tooth or thread defining a single lead, double lead, triple lead, or other multiple leads as desired for the particular application. The wire-like member or members can be heat treated to embed the cables in the stranded internal wire cable used as the flexible core as is conventional. A 13° lead is preferable with a lead angle in a range of between 5° and 70° inclusive. In all other respects, the translator means 32a and clutch means 80a of FIGS. 9 and 10 operates in the same manner as previously described with respect to FIG. 8 and FIGS. 12–15.

During powered operations, the motor (not shown) drives the clutch means 80 or 80a in either rotational direction. The clutch means 80 or 80a transmits rotational motion through gear means 90 or 90a to the rotatable hub 54 or 54a. The drive member engaging protrusions 56 or 56a formed on the rotatable hub 54 or 54a engage the drive member 48 or 48a to move the drive member 48 or 48a longitudinally in either direction corresponding to the rotational direction of the reversible motor. When opening the movable closure, initially the latch mechanism is released as is conventional, and the motor is rotated in a first direction to push the elongated means 30 or 30a and bracket means 28 or 28a with sufficient force to release the movable closure from the seals extending around the periphery of the portal, in cooperation with simultaneously resetting a power striker to its initial position. The closure member is then driven by the elongated means 30 or 30a through bracket means 28 or 28a along rear guide means 22 or 22a until reaching the fully open position as indicated by position sensor means 88 or 88a. The motor is then deenergized, and the door is held in an open position by detent means as is conventional. During powered closing operations, the motor is energized in the reverse direction pulling the elongated means 30 or 30a and connected bracket means 28 or 28a along the rear guide means 22 or 22a from the open position to the closed position. The motor has sufficient power to overcome the detent means holding the movable closure in the open position, and also has sufficient power to pull the movable closure through the curved portion of the guide tracks adjacent the closed position moving the striker and fork bolt of the latch mechanism all the way through the secondary position (shown schematically in phantom lines at 8b and 126b in FIG. 11) to the primary latch position (shown schematically in phantom lines at 8 and 126 in FIG. 11). The power striker is then actuated in order to move the sliding door into the seal extending around the periphery of the portal into a sealed and final closed position (shown schematically in solid lines at 8a and 126a in FIG. 11). During manual opening or closing movement, the movable closure is moved in the desired direction and at the desired speed with the clutch means 80 or 80a disengaged from the drive motor. The motion of the clutch means 80 or 80a in response to manual movement continues to provide an appropriate signal through sensing means 88 or 88a to indicate the position of the movable closure to the electronic control unit.

Figure 11:
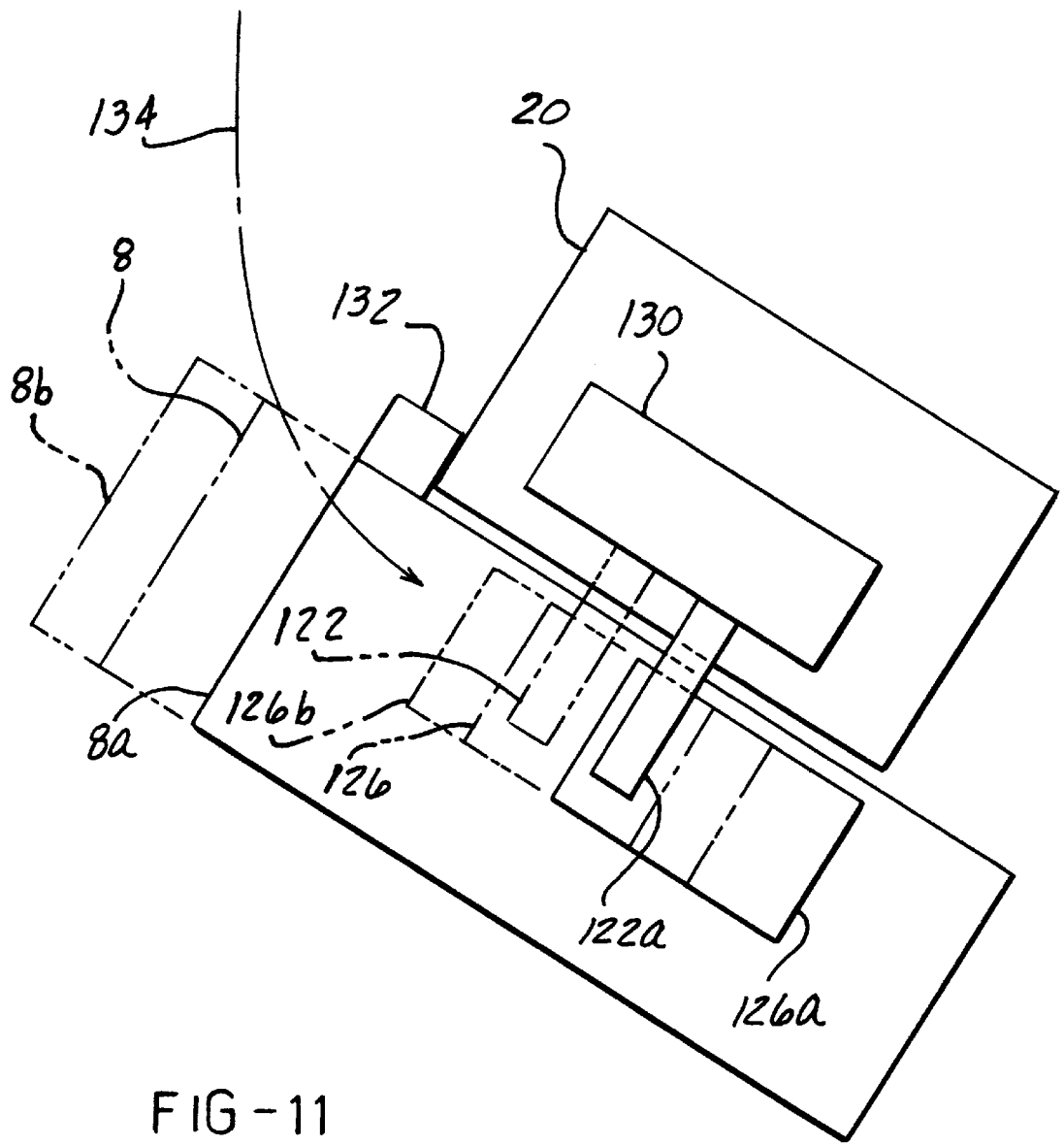
FIG. 11 is a schematic view of a movable closure with fork bolt and striker means movable between a secondary latch position and a primary latch position.
Figure 13:
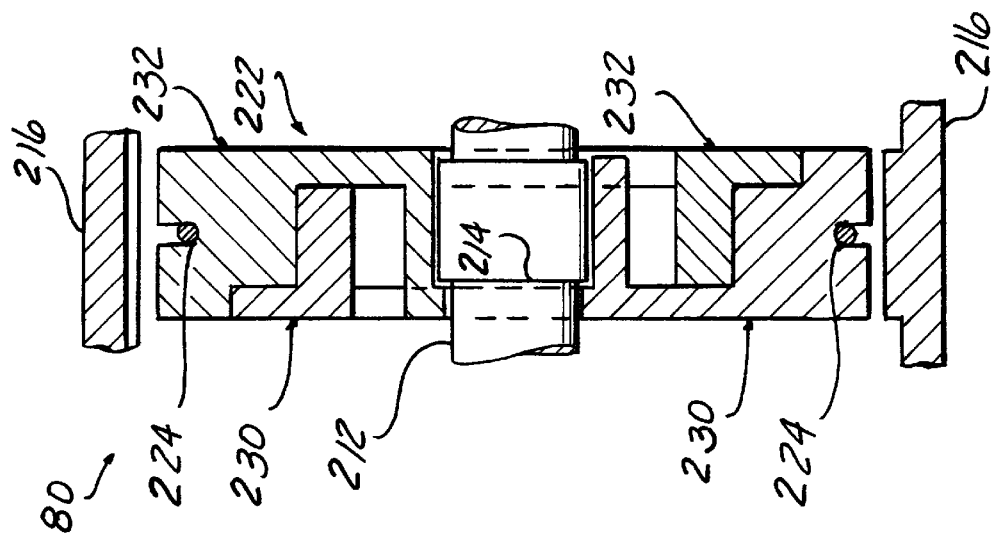
FIG. 13 is a cross-sectional view of the clutch according to the present invention in a disengaged position taken along a line 13—13 as shown in FIG. 12.
Figure 12:
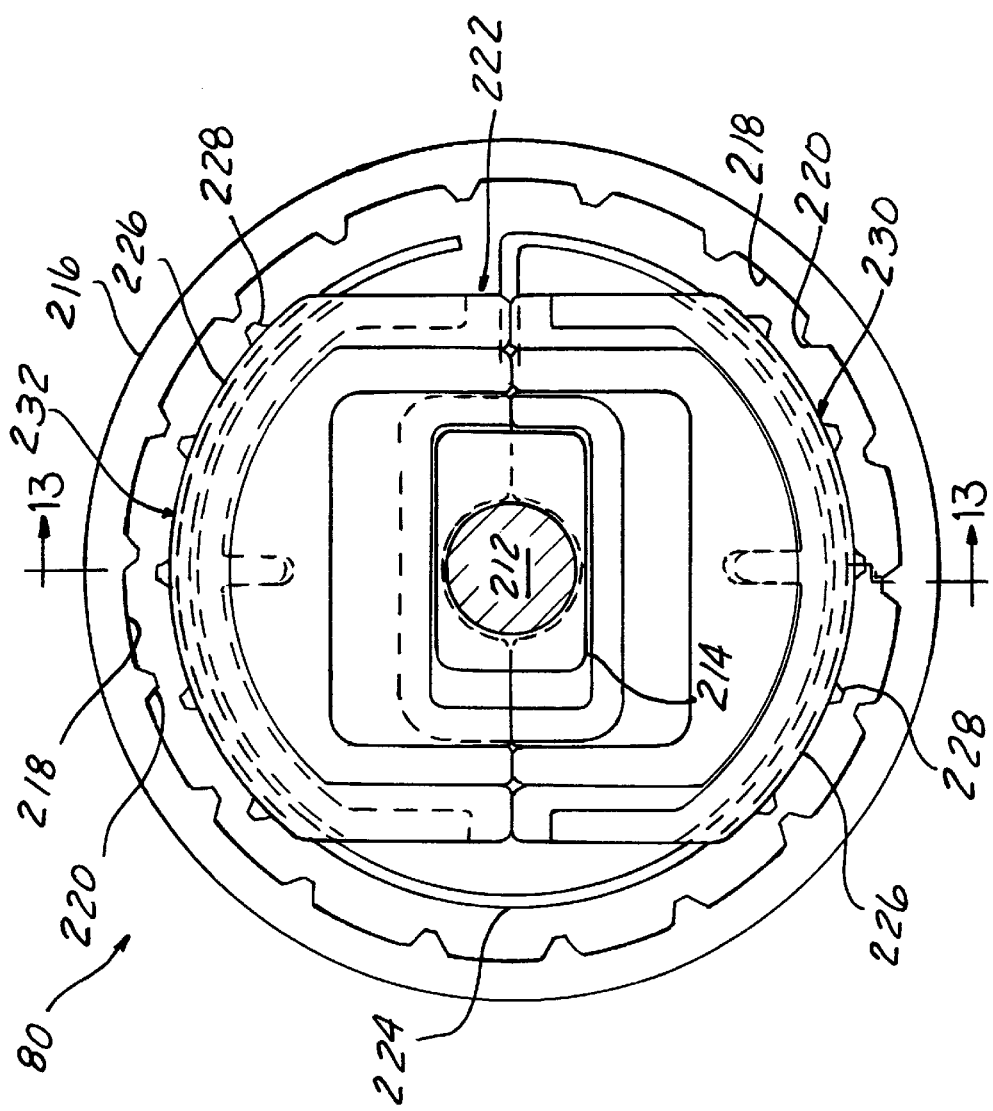
FIG. 12 is a view of a clutch according to the present invention in a disengaged position with certain portions removed for clarity.
Figure 15:
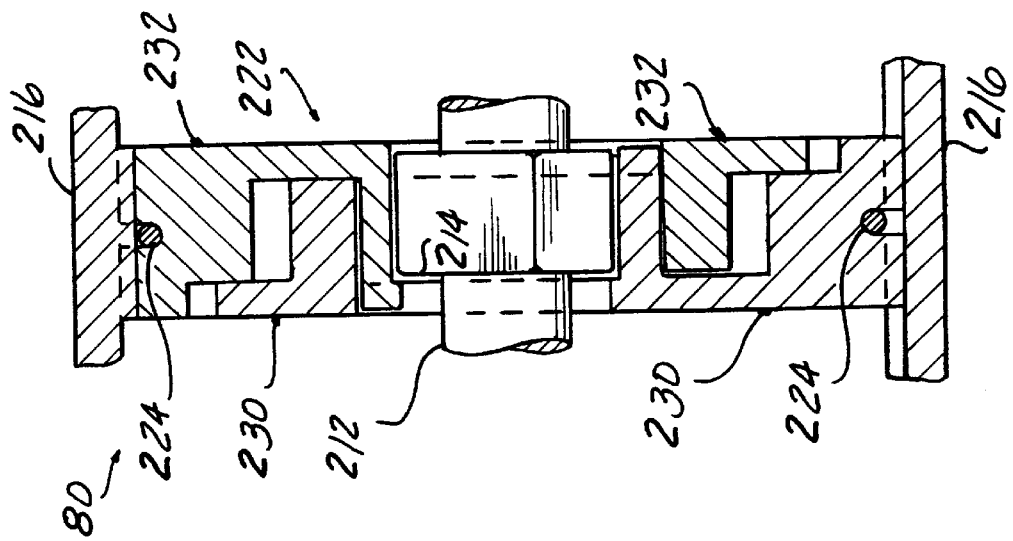
FIG. 15 is a cross-sectional view of the clutch according to the present invention in an engaged position taken along a line 15—15 as shown in FIG. 14.
Figure 14:
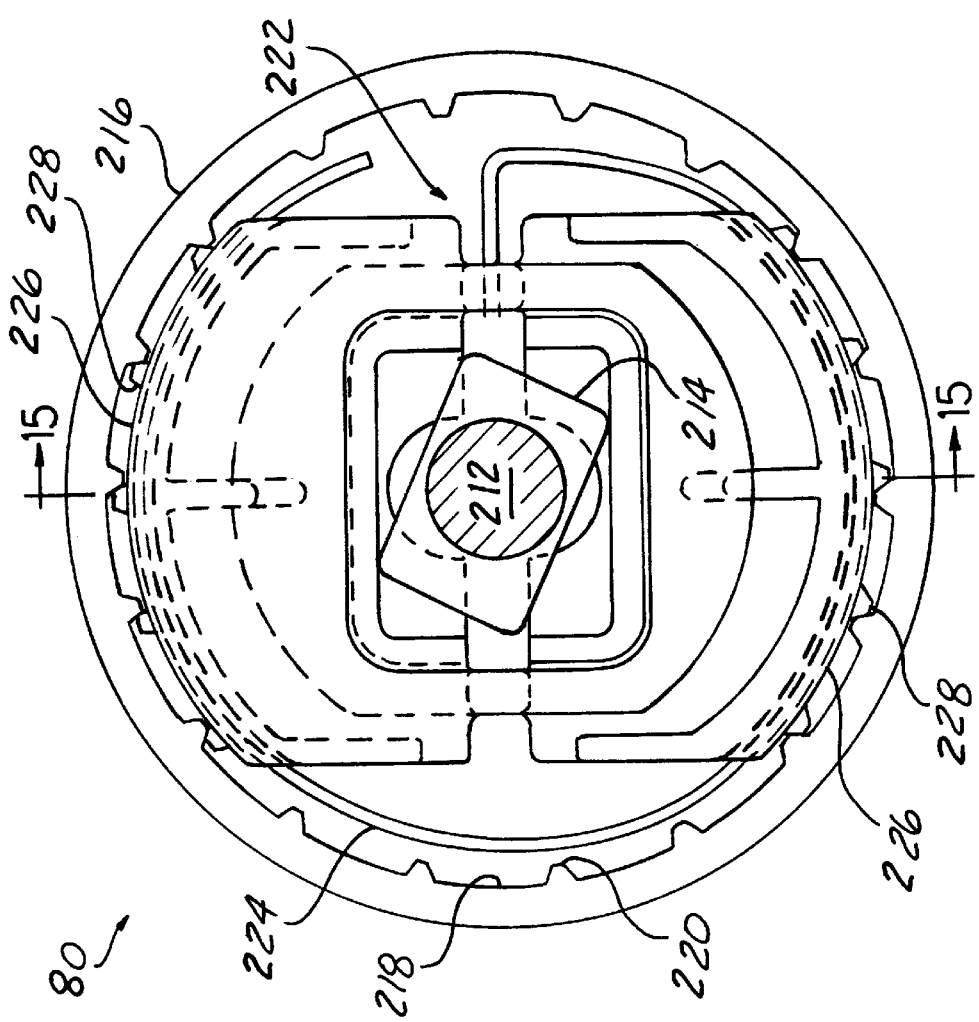
FIG. 14 is a view of the clutch according to the present invention in an engaged position with certain portions removed for clarity.

Referring now to FIG. 11, the power drive moves the moveable closure 8 along the fixed path 134 between the open position and the closed position with respect to the portal 20 defining the passage through the barrier. The moveable closure 8 is operably engageable with first and second guide tracks generally extending along first and second edges respectively of the moveable closure 8. The power means 130 moves the fork bolt 126 and striker means 122 when in the primary position (shown schematically in phantom lines at 122 and 126 in FIG. 11) to engage the moveable closure 8 with a seal strip 132 extending substantially around the portal 20, such that the moveable closure 8 moves sufficiently along the fixed path 134 between an unsealed position (shown schematically in phantom lines at 122 and 126 in FIG. 11) and a sealed position (shown schematically in solid line at 122a and 126a in FIG. 11) to compress the seal strip 132 between the moveable closure 8 and the barrier.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a power drive system for a sliding door mounted on at least one side of a vehicle for sliding movement forwardly and rearwardly of the vehicle along a fixed nonlinear path between an open position and a closed position with respect to a frame defining a door opening, said system including reversible power drive means operable when actuated to selectively drive said door in opening or closing movement, said sliding door being operably engageable with first and second guide tracks generally extending along first and second opposite edges respectively of said sliding door, and latch means for holding the sliding door in the closed position, the latch means including a fork bolt and a striker engageable with one another in a secondary latch position wherein said fork bolt and said striker are partially engaged and a primary latch position wherein said fork bolt and said striker are fully engaged, the improvement to the power drive system comprising:

a bracket operably connected to said sliding door adjacent a rear edge generally midway between said first and second opposite edges of said sliding door;

guide means connected to said vehicle generally midway between said first and second opposite edges, and operably engaging said bracket for guiding said sliding door along said fixed nonlinear path between said open and closed positions of said sliding door;

elongated means slidably disposed within said guide means and connected to said bracket for driving said sliding door along said fixed nonlinear path, said elongated means having first and second longitudinal ends spaced apart from one another, the first end of said elongated means being connectible to said bracket for pulling said sliding door from said open position to said closed position and for pushing said sliding door from said closed position to said open position; and translator means operably engageable with said elongated means for powering movement of said elongated means with respect to said guide means along said fixed nonlinear path, said translator means being disposed adjacent an edge of said frame defining said door opening generally midway between said first and second guide tracks.

2. The power drive system of claim 1 wherein:

said translator means further pulls said sliding door in translating movement extending transversely inboard with respect to a longitudinal axis of the vehicle until said fork bolt and said striker pass through said secondary latch position to said primary latch position.

3. The power drive system of claim 1 wherein said translator means comprises:

gear means for translating rotary motion into linear motion of said elongated means along the guide means in either direction to impart said opening and closing movement to said sliding door;

reversible drive means for providing said rotary motion in either rotational direction; and clutch means, disposed between said drive means and said gear means, for accommodating said sliding movement of said sliding door along said fixed nonlinear path.

4. The power drive system of claim 3 wherein said clutch means is moveable between a disengaged position to accommodate manual movement of said sliding door and an engaged position to accommodate powered movement of the sliding door between said open position and said closed position.

5. The power drive system of claim 3 further comprising:

position sensing means, responsive to rotary movement of said clutch means, for transmitting a signal representative of a location of said sliding door during said sliding movement of said sliding door along said fixed nonlinear path.

6. The power drive system of claim 5 wherein said position sensing means comprises:

a magnet disposed on said clutch means for rotation therewith as said sliding door moves along said fixed nonlinear path; and a magnet sensor sensing the magnet as the clutch means rotates during said sliding movement of the sliding door.

7. The power drive system of claim 1 wherein said translator means comprises:

a rotatable hub having engaging protrusions on an external surface and a plurality of first gear teeth formed on an internal surface, said hub having a first axis and connecting to a first shaft by bearings for rotation about said first axis;

at least one intermediate gear including a reduced diameter portion supporting a plurality of second gear teeth on an external periphery thereof in intermeshing engagement with said plurality of first gear teeth, and an enlarged diameter portion having a plurality of third gear teeth supported on an external periphery thereof; and a pinion having a plurality of fourth gear teeth formed on an external periphery thereof in intermeshing engagement with said plurality of third gear teeth.

8. The power drive system of claim 7 wherein:

each intermediate gear is rotatable about an axis of rotation generally parallel to and offset from said first axis; and said pinion has an axis of rotation coaxial with said first axis.

9. The power drive system of claim 7 comprising:

at least two said intermediate gears having rotational axes in a common plane and on diametrically opposite sides of said first axis.

10. The power drive system of claim 1 wherein said latch means further comprises:

said fork bolt connected to one of said sliding door and said frame;

said striker engageable with said fork bolt when in said primary latch position and said secondary latch position, said fork bolt and said striker being for moving said sliding door to a fully closed and sealed position when said fork bolt and said striker are in said primary latch position, one of said fork bolt and said striker being moveable with respect to said sliding door between said secondary latch position and said primary latch position; and means for moving said one of said fork bolt and said striker when in said primary latch position to engage said sliding door with a seal strip extending substantially around said door opening, such that said sliding door moves in translating movement extending transversely inboard with respect to a longitudinal axis of the vehicle sufficiently along said fixed nonlinear path between an unsealed position and a sealed position to compress said seal strip between said sliding door and said frame.

11. The power drive system of claim 1 wherein said translator means comprises:

said translator means further for pulling said sliding door in translating movement extending transversely inboard with respect to a longitudinal axis of the vehicle until said fork bolt and said striker pass through said secondary latch position to said primary latch position;

reversible drive means for providing rotary motion in either rotational direction;

gear means for converting said rotary motion of said reversible drive means into linear motion of said elongated means along said guide means in either direction to impart said opening and closing movement to said sliding door, said gear means including a rotatable hub having engaging protrusions on an external surface and a plurality of first gear teeth formed on an internal surface, said hub having a first axis and connecting to a first shaft by bearings for rotation about said first axis, each one of at least two intermediate gears including a reduced diameter portion supporting a plurality of second gear teeth on an external periphery thereof in intermeshing engagement with said plurality of first gear teeth, and an enlarged diameter portion having a plurality of third gear teeth supported on an external periphery thereof, each intermediate gear being rotatable about an axis of rotation generally parallel to and offset from said first axis, and a pinion having a plurality of fourth gear teeth formed on an external periphery thereof in intermeshing engagement with said plurality of third gear teeth, said pinion having an axis of rotation coaxial with said first axis;

clutch means, disposed between said drive means and said gear means, for accommodating said sliding movement of said sliding door along said fixed nonlinear path; and position sensing means, responsive to rotary movement of said clutch means, for transmitting a signal representative of a location of said sliding door during said sliding movement of said sliding door along said fixed nonlinear path, said position sensing means including a magnet disposed on said clutch means for rotation therewith as said sliding door is moved along said fixed nonlinear path, and a magnet sensor sensing the magnet as said clutch means rotates during said sliding movement of the sliding door.

* * * * *